United States Patent [19]

Schafer

[11] Patent Number: 4,653,423

[45] Date of Patent: Mar. 31, 1987

[54] AUTOMATIC DISHWASHER CONDITION INDICATOR

[76] Inventor: Robert M. Schafer, P.O. Box 881, Carefree, Ariz. 85377

[21] Appl. No.: 776,495

[22] Filed: Sep. 16, 1985

[51] Int. Cl.⁴ .............................................. G01F 23/00
[52] U.S. Cl. ...................................... 116/228; 73/322; 134/113
[58] Field of Search .......................... 116/228, 109–111, 116/227; 73/322, 322.5, 305, 306, 319, 314; 134/113

[56] References Cited

U.S. PATENT DOCUMENTS

| | | | |
|---|---|---|---|
| 2,895,447 | 7/1959 | Burrell | 116/228 |
| 3,354,719 | 11/1967 | Taylor | 73/322.5 |
| 3,526,201 | 9/1970 | Larson | 116/114 |
| 3,608,514 | 9/1971 | Dunn | 116/118 |
| 3,941,078 | 3/1976 | McCloskey | 116/118 |
| 3,960,107 | 6/1976 | McCloskey | 116/118 |
| 4,170,136 | 10/1979 | Martineau | 73/322 |

FOREIGN PATENT DOCUMENTS

| | | | |
|---|---|---|---|
| 1016063 | 9/1957 | Fed. Rep. of Germany | 116/228 |
| 1203192 | 1/1960 | France | 116/228 |

Primary Examiner—Harry N. Haroian
Attorney, Agent, or Firm—Warren F. B. Lindsley

[57] ABSTRACT

An indicator placed within a dishwasher showing whether or not the dishwasher has performed its dishwashing cycle employing a two-piece hollowed elongated casing apertured at one end for receiving dishwashing fluid when placed in a vertical position in the dishwasher and having a float positioned within the casing for floating vertically to a raised position when the dishwasher has gone through a dishwashing cycle and assuming another lower position after removing dishwasher fluid from a previous operation when the dishwashing cycle has been performed.

3 Claims, 5 Drawing Figures

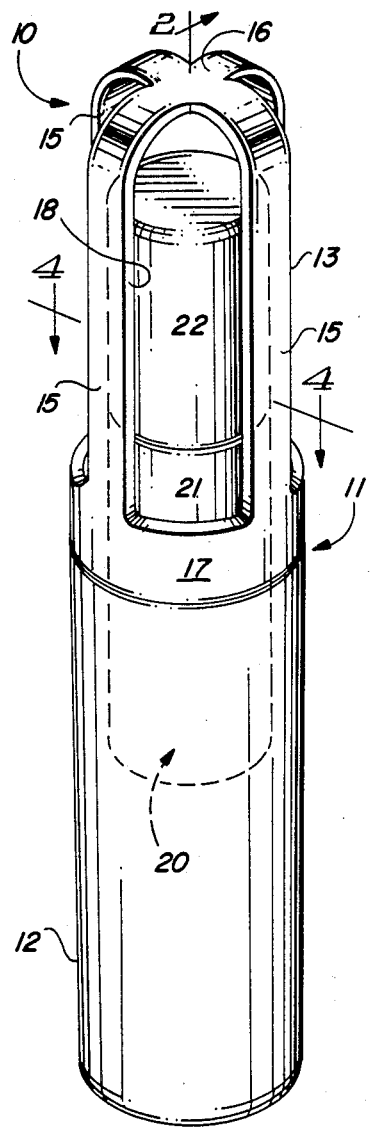
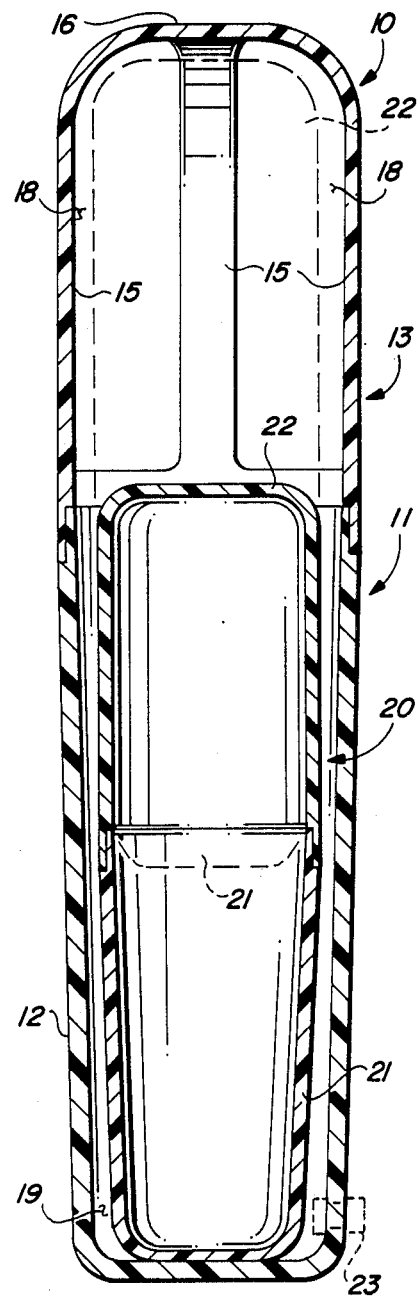
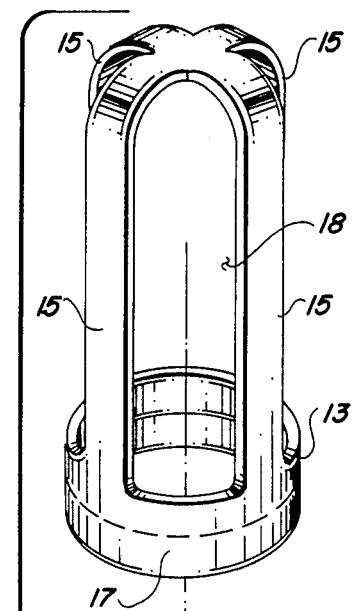
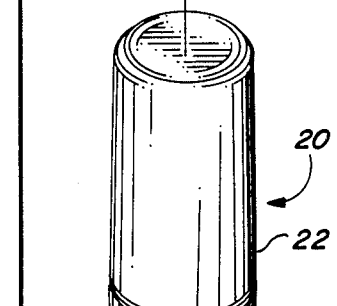
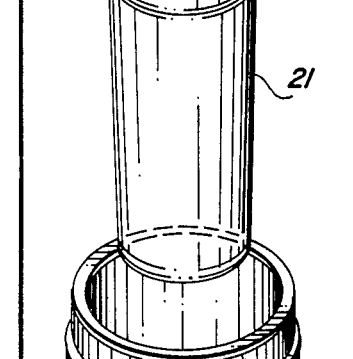
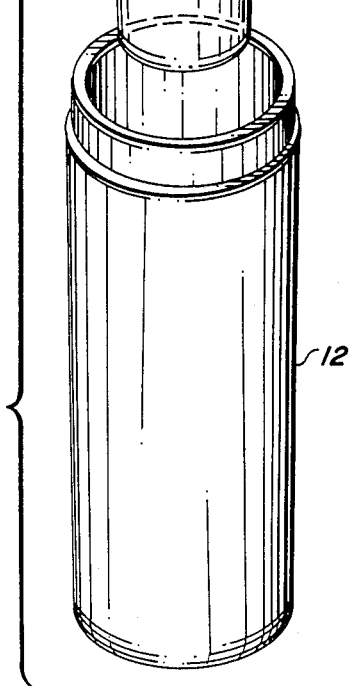

— 4,653,423 —

AUTOMATIC DISHWASHER CONDITION INDICATOR

BACKGROUND OF THE INVENTION

This invention relates to an improved indicator for showing that a dishwasher has been run to wash the dishes therein, and more particularly, for indicating a means of showing that the dishwashing cycle of a dishwasher has been or has not been completed.

DESCRIPTION OF THE PRIOR ART

U.S. Pat. No. 3,608,514 discloses an indicating device for dishwashers which collects water during the wash cycle to indicate when the dishwasher is open thereafter, that the dishes inside are clean. The device comprises a two-state fluid tilt or position indicator in which a casing is provided with a midwall to catch dishwasher fluid during the dishwashing operation, and discharges such fluid caught within a first chamber of the casing into a second chamber. The second chamber of the casing discharges the dishwasher fluid into the dishwasher chamber or other exhaust means when the dishwasher is opened and tilts sufficiently forward to evacuate the fluid from the first chamber. A float is utilized in the first chamber which has a stem with a diversity indication of discs thereon. An indicator window is provided so that one disc is presented through the window when the one chamber is containing the dishwasher fluid and another disc is presented through the indicator window when said one chamber has been discharged of said fluid.

U.S. Pat. Nos. 3,526,201; 3,941,078 and 3,960,107 disclose irrigation signaling devices which employ various signaling devices to indicate when irrigation has occurred.

SUMMARY OF THE INVENTION

In accordance with the invention claimed, a new and improved two-state indicator is disclosed for dishwasher use which is simple and economical to manufacture and automatically indicates the washed or non-washed condition of the contents of the dishwasher.

It is, therefore, one object of this invention to provide a new and improved automatically operable dishwasher indicator.

Another object of this invention is to provide a novel two-state indicator which may be portably mounted in the dishwasher.

A further object of this invention is to provide a novel indicator of simple design for dishwasher use employing a float which may be economically manufactured and sold, and which is formed of a minimum of parts.

Further objects and advantages of the invention will become apparent upon consideration of the following detailed description and accompanying drawing.

BRIEF DESCRIPTION OF THE DRAWING

The present invention may be more readily described by reference to the accompanying drawing in which:

FIG. 1 is a perspective view of the automatic dishwasher indicator for clean or soiled dishes therein, and embodying the invention;

FIG. 2 is a cross-sectional view of FIG. 1 taken along the line 2—2 and showing in dash lines the float in its upper position;

FIG. 3 is a top view of FIG. 1 rotated 45 degrees;

FIG. 4 is a cross-sectional view of FIG. 1 taken along the line 4—4;

FIG. 5 is an exploded view of the structure shown in FIGS. 1-4.

DESCRIPTION OF THE PREFERRED EMBODIMENT

Referring more particularly to the drawing by characters of reference, FIGS. 1-5 disclose an indicator 10 for use in a dishwasher (not shown) for indicating, when opened, whether or not the wash cycle has been performed, and the dishes in the dishwasher have been washed.

This indicator may be, for example, placed in the tray or rack supporting the knives, forks and spoons being washed, or in a compartment on the inside surfaces of the door or walls of the dishwasher which are exposed to the dishwasher fluid being used during a dishwashing cycle.

Indicator 10 comprises an elongated hollow cylindrical-like casing or housing 11 comprising a bottom 12 and a telescopic interconnecting top 13. Top 13 comprises a slotted or web-shaped configuration formed by one or a plurality of spacedly arranged webs 15 which extend from an apex 16 of top 13 in a curved or partially arcuate manner to its base 17 forming therebetween one or more apertures which may comprise one or more elongated openings 18 extending along the length of top 13. Thus, the hollow interior of housing 11 is open at its top, and forms a pocket 19 inside of its sides and bottom for the collection of dishwasher fluid.

Within housing 11 is positioned a movable hollow elongated element which may be, for example, a cylindrical-like hollow float 20 or other element, such as a ball having a specific gravity less than dishwasher water. Float 20 comprises two telescopically interconnected parts 21 and 22 forming the bottom and top, respectively, of the float. The shell of float 20 is free of water, containing, for example, air, and is impervious to water and, therefore, hollow, empty and airtight. When it is positioned in housing 11 in the position shown in FIG. 2, it is free to move longitudinally in a vertical direction of housing 11 when mounted upright. Thus, water received and retained in pocket 19 of sides and bottom 12 of housing 11 will cause it to float upwardly in the housing until it reaches substantially the position shown in FIG. 1.

The outside or all or part of the periphery of float 20 or of part 22 of float 20 may be colored in contrast to housing 11 or marked with suitable legends to indicate when, in its upper position, as shown in FIG. 1, the dishwasher has gone through its washing cycle.

Further, if so desired, the telescopic parts of housing 11 and float 20 may be threadedly connected, glued together or interconnected in any other manner, and still fall within the scope of this invention.

It should also be noted that even though the parts of housing 11 and float 20 taper outwardly toward their interconnecting areas and thus are not true cylinders, the parts of each may have the same diameter along their full lengths, and still fall within the scope of this disclosure.

Further, a drain valve or plug 23, of any type, as shown symbolically in dash lines in FIG. 2, may be used for draining housing 11 in place of pouring out the dishwasher fluid through the apertured tops.

Although but one embodiment of the present invention has been illustrated and described, it will be apparent to those skilled in the art that various changes and modifications may be made therein without departing from the spirit of the invention or from the scope of the appended claims.

What is claimed is:

1. A portable self-contained dishwasher condition indicator comprising:

a hollow cylindrical-like casing for placing within a dishwasher in fluid communication with the inside of the dishwasher, said casing comprising two telescopically connected parts with one of said parts open at one end and closed at its other end for defining a fluid collecting pocket and with the closed end forming a bottom for said casing when said casing is vertically positioned in a dishwasher, the other of said parts being open ended for telescopically permanently connecting with the open end of said one of said parts and the other end of said other of said parts being domed and slotted to form from the dome a plurality of spaced elongated slots extending along substantially the length of said other of said parts, and a float slidably positioned within the hollow interior of said casing for movement longitudinally of its length, said float comprising two telescopically connected hollow watertight air filled parts forming an elongated cylindrical-like configuration, said float when moved vertically in said casing by fluid admitted thereinto through said slotted end of said other of said parts during a dishwashing cycle floating upwardly to the slotted end of said other of said parts of said casing to indicate by its presence at the upper end of the casing that a dishwashing cycle has occurred, said float sequentially returning to the closed end of said casing when the admitted fluid in said casing has been poured out of said slotted end of said other of said parts.

2. A portable self-contained dishwasher condition indicator comprising:

a hollow cylindrical-like casing for placing within a dishwasher in fluid communication with the inside of the dishwasher, said casing comprising two telescopically connected parts with one of said parts open at one end and closed at its other end for defining a fluid collecting pocket and with the closed end forming a bottom for said casing when said casing is vertically positioned in a dishwasher, the other of said parts being open ended for telescopically permanently connecting with the open end of said one of said parts and the other end of said other of said parts being provided with a plurality of slots spacedly arranged along the length of the other of said parts for admitting dishwasher water into the interior of said casing, and a float slidably positioned within the hollow interior of said casing for movement longitudinally of its length, said float comprising two telescopically connected hollow watertight air filled parts forming an elongated cylindrical-like configuration, said float when moved vertically in said casing by fluid admitted thereinto through said slotted end of said other of said parts during a dishwashing cycle floating upwardly to the slotted end of said other of said parts of said casing to indicate by its presence at the upper end of the casing that a dishwashing cycle has occurred, said float sequentially returning to the closed end of said casing when the admitted fluid in said casing has been removed.

3. The dishwasher indicator set forth in claim 2 in further combination with:

a plug for draining dishwasher fluid from the bottom of said casing.

* * * * *